United States Patent [19]

Rast, Jr.

[11] 4,357,884
[45] Nov. 9, 1982

[54] PLANT PROTECTION SYSTEM

[75] Inventor: Henry J. Rast, Jr., P.O. Box 444, Johns Island, S.C. 29455

[73] Assignee: Henry J. Rast, Jr., Johns Island, S.C.

[21] Appl. No.: 180,567

[22] Filed: Aug. 25, 1980

[51] Int. Cl.³ .................... A01C 11/00; A01G 23/02
[52] U.S. Cl. ........................................ 111/2; 47/9; 47/30; 47/73
[58] Field of Search ...................... 111/1–4; 47/9, 26–30, 17, 73, 74, 75, 77; 172/1, 151

[56] References Cited

U.S. PATENT DOCUMENTS

| | | | |
|---|---|---|---|
| 1,936,988 | 11/1933 | Otwell | 47/77 |
| 2,062,410 | 12/1936 | Garcia | 47/30 |
| 2,952,322 | 9/1960 | Jurcheck | 172/1 X |
| 3,042,118 | 7/1962 | Norris | 172/1 |
| 3,121,973 | 2/1964 | Phillips et al. | 47/9 |
| 3,306,239 | 2/1967 | Martin | 111/3 X |
| 3,331,155 | 7/1967 | Chancellor | 47/74 |
| 3,561,158 | 2/1971 | Marcan | 47/86 |
| 3,692,120 | 9/1972 | Cline | 172/151 |
| 3,828,473 | 8/1974 | Morey | 47/30 |
| 3,932,319 | 1/1976 | Clendinning et al. | 47/9 |
| 4,186,670 | 2/1980 | Hagner | 111/1 |

FOREIGN PATENT DOCUMENTS

| 769696 | 3/1957 | United Kingdom | 47/30 |
|---|---|---|---|
| 1453883 | 10/1976 | United Kingdom | 47/17 |

Primary Examiner—James R. Feyrer
Attorney, Agent, or Firm—Schuyler, Banner, Birch, McKie & Beckett

[57] ABSTRACT

In the transplanting of seedlings, such as, tomato plants, soil prepared to receive the plant seedlings has a mulch layer of sheet material spread over the area in which the plants are to be grown and spaced holes are formed through the sheet material and into the soil with a seedling then introduced into each hole. Thereafter, a generally tubular protector is inserted through the sheet material into the soil surrounding each seedling so that the peripheral exterior of each protector is closely surrounded by the sheet material at the perimeter of each hole with an upper portion of each protector extending above the sheet material to enclose the stem portion of the seedling and a lower portion of each protector embedded in the soil beneath the sheet material to surround the root formation of the seedling. Each protector may have a downwardly tapering form where it encloses the seedling.

14 Claims, 5 Drawing Figures

PLANT PROTECTION SYSTEM

BACKGROUND OF THE INVENTION

This invention relates to the field of agriculture wherein farm products are mass produced through growing individual plants spaced over a substantial acreage of land. More particularly, the invention relates to transplanting plant seedlings by utilizing techniques which give improved seedling protection during the early stages of plant growth with resulting higher crop yield and improved quality of the products.

It is well known in farming technology that certain farm products are best produced by carrying out seed germination in nursey beds or seedling flats and, after the plant seedlings have grown sufficiently, transplanting the individual seedlings to spaced locations usually disposed in parallel rows in a field where the plant seedlings are to grow and finally mature. The technique of transplanting seedlings from nursery beds or seedling flats to the field rows is commonly used in growing tomatoes, cabbage, tobacco, rice, celery, watermelons, cantalopes, cucumbers, strawberries, and similar types of row crops.

Various transplanting machines and related equipment have been developed to handle the individual plant seedlings taken from the nursery beds or raised in seedling flats and then planted in the field rows where the plants grow and mature until harvesting of the farm products produced thereby. These transplanting machines frequently employ at least one operator riding on the transplanting unit to individually handle the young plant seedlings taken from nursery beds or seedling flats and implant them to be spaced along the rows in which these plants are to finally grow and mature.

Whereas use of machines of the above referred to type is contemplated in carrying out the transplanting method of the instant invention, the primary benefits of this invention are derived from the techniques utilized and combined in carrying out plant seedling placement and in using the invention components properly interrelated to give desirable and beneficial results. Then, more reliable and consistent seedling survival, stronger and greater plant growth, higher crop yield and greater assurance against young plant damage by reason of wind, insects, rain, blowing sand, frost, etc. can be achieved.

In the agricultural field, the prior art has proposed protecting plant seedlings with a conical or cylindrical tube or bottomless cup, frequently made of paper, that encloses the stem or upper portion of the seedling which projects above the soil surface. Such plant protectors and their use with individual plant seedlings are exemplified in the U.S. Pat. Nos. to Wright, 404,585; Hassel, 1,523,659; and Garcia, 2,062,410. Tierney British Pat. No. 769,696 is also exemplary of this prior art. The use of such prior art protectors has been subject to a serious disadvantage and has never achieved any practical success. Rainfall tends to compact the soil around the protectors which inhibits drainage through the soil of water which falls inside the protectors. The result has been to saturate the young seedling roots causing the plants to "drown".

Further, the development of automatic transplanting machines such as alluded to hereinabove, is exemplified in Martin, Jr. U.S. Pat. No. 3,306,239 and Huang et al. U.S. Pat. No. 3,446,164. It is recognized that the type transplanting machine approach suggested in these two patents may be readily adapted for utilization in carrying out the transplanting method of this invention. However, there are many types of machines, tractor drawn or self propelled, that may be effectively utilized in carrying out the method of this invention to achieve mass transplanting operations in placing seedlings in field rows.

It also is acknowledged that the prior art recognizes the advantages to be obtained by employing a plastic mulch layer overlying the soil surface along each row in which the spaced seedlings are to be planted. Indeed, the abovementioned Martin, Jr. patent contemplates use of a black plastic mulch sheet with plant seedlings grown and transplanted while contained in peat moss pots being inserted down through the plastic mulch sheet. In Martin, Jr., the peat moss pots are passed through the plastic sheet and into the soil to be disposed beneath such sheet with the top of the cup flush with the sheet.

Further developments in the prior art of planting and growing plants where a plastic film is spread over the area where the crops are to be grown may be found in Bigelow et al U.S. Pat. No. 3,914,900. In this patent, the plastic sheet may have holes punched or burned in the sheeting through which the plants can emerge incident their growth. This patent teaches utilizing plugs that are punched through the plastic sheet covering the row of soil with the plugs flush with the sheet and accommodating material providing a fertilizer, nutrient, insecticide, etc. to be transferred through the plastic sheet covering the soil and into the soil.

However, none of the teachings of the prior art offer the advantages to be achieved by utilization of the method invention hereinafter described.

It is a principal object of this invention to provide a method for transplanting plant seedlings wherein beneficial and improved results are obtained in protecting the seedlings for their survival during their early growth after transplanting.

It is a further important object of this invention to provide a transplanting method for plant seedlings wherein stronger plant growth is produced with consequent increased quantity and quality of yield from the individual plants once they have matured.

It is also an object of the present invention to provide a seedling transplanting method wherein, particularly during the fragile early stages of seedling growth, the normally exposed stem and foliage above the soil surface is protected against excessive rain, wind, frost and other environmental conditions while the entire root formation, as well as the plant stem and foliage, are insulated against excessive exposure to rain water, insects, etc. that might destroy the seedling at or shortly after its planting in the field rows.

The above recited, and other objects of the invention will become apparent upon consideration of the detailed description of a preferred embodiment of the invention that is described in connection with the accompanying drawing following the Summary of the Invention.

SUMMARY OF THE INVENTION

The invention is principally concerned with the transplanting of seedlings, such as tomatoes, tobacco, watermelons, cantalopes, strawberries, etc., in rows in a field prepared to receive the plant seedlings. A mulch layer of sheet material, such as black polyethylene plastic sheeting, is spread over the area of each row in which the plants are to be grown. Employing usual farming techniques, the field has the soil prepared in parallel rows, each row preferably having a raised bed portion elevated above the land surface, and the plastic sheeting is applied in the form of a strip of sheet material spread longitudinally over each row. Preferably, the longitudinal edges of each strip of plastic sheeting that is spread over a row are buried in the soil at the edges of the row.

Holes are then formed through the sheet material and into the soil beneath the material at each of a plurality of spaced locations along each row. The actual transplanting is then carried out by a plant seedling being introduced into each hole at the spaced locations along each row.

Thereafter, a generally tubular protector is inserted through the sheet material into the soil surrounding each seedling. Importantly, the peripheral exterior of each protector is closely surrounded by the sheet material at the surface perimeter of each hole. While some spacing between the protector and the sheet may exist, it should be kept to a practical minimum. This relationship between the exterior of the protector and the perimeter of the aperture in the sheet material serves to essentially exclude or substantially restrict the passage of moisture between the protector periphery and the aperture in the sheet material. In this transplanting operation the generally tubular protector is positioned relative to the mulch layer of sheet material and soil therebeneath such that a lower portion of each protector is embedded in the soil beneath the sheet material to surround the root formation of the seedling while an upper portion of each protector extends a substantial distance above the sheet material sufficient to enclose the stem and at least a major extent of the foliage portion of the seedling.

The generally tubular protector may be constructed of a variety of different substances. While not essential, it may be advantageous to have the protectors constructed of a substance that is subject to decomposition or disassociation under exposure to the conditions occurring in the area in which the plants are to be grown. Thus the substance may be biodegradable. However, the protectors should remain intact until the plants reach a substantial growth at least until the lower foliage clears the top of the protector. There are advantages to forming the protector with its generally tubular configuration having a longitudinal taper throughout its length so that the protector tapers downwardly toward and into the soil where it encloses the seedling. Preferably fumigation treatment with pesticides using conventional procedures is done either prior to or concurrently with placing the mulch layer of sheet material longitudinally over each row.

DESCRIPTION OF A PREFERRED EMBODIMENT

Figure 1:
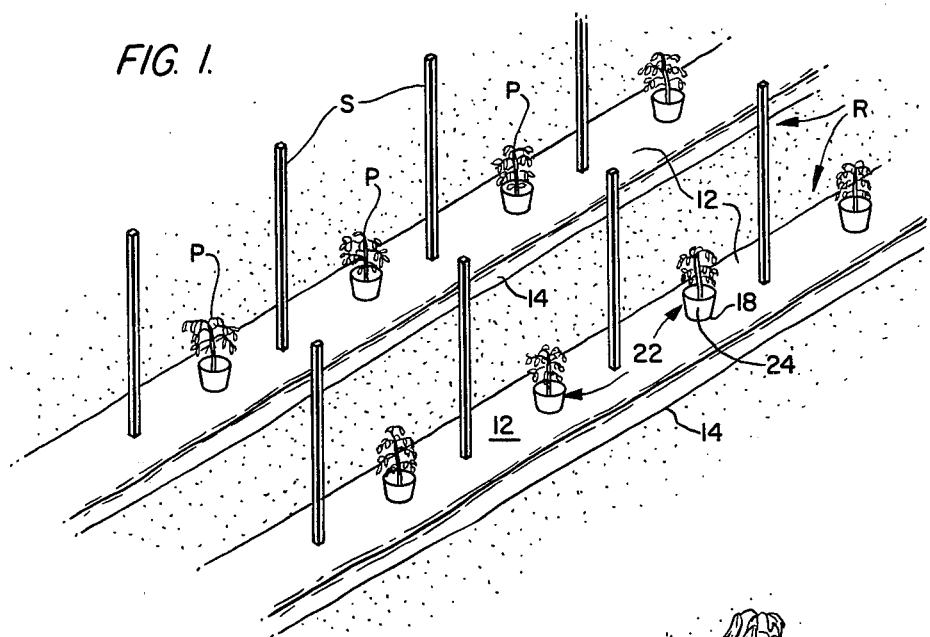
FIG. 1 is a perspective view of a portion of two field rows showing a mulch layer of sheet material spread longitudinally over each row and several partially grown seedlings having a plant protector associated with each seedling.
Figure 2:
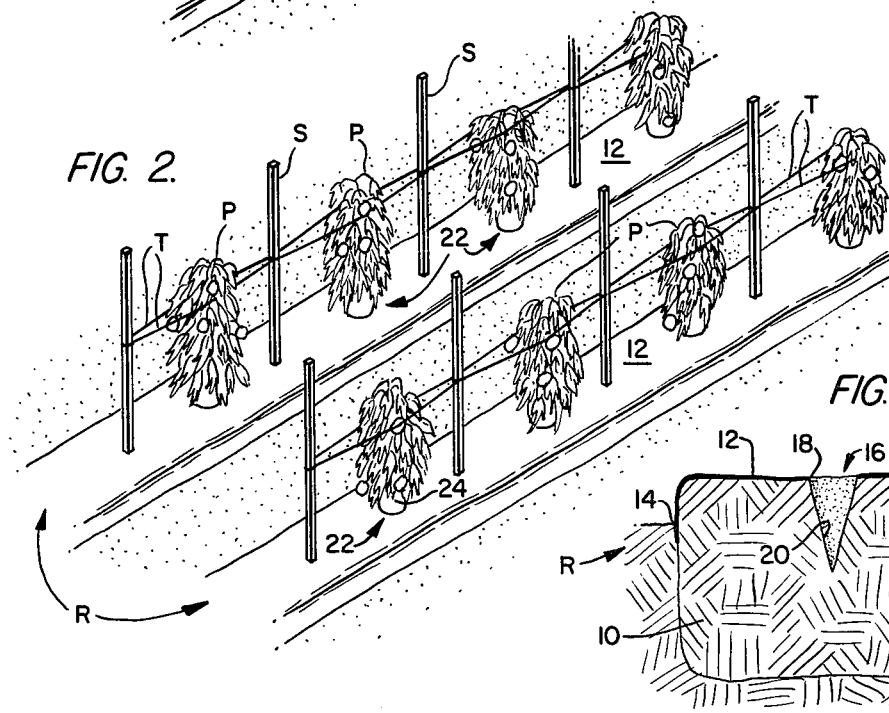
FIG. 2 is a view similar to FIG. 1 but showing the transplanted plants in a more advanced stage of growth with supporting stakes and twine in place as frequently used in tomato plant growing techniques.

FIGS. 1 and 2 on the drawing generally illustrate how the field rows appear when the method of the invention is employed in conjunction with growing stake tomatoes. FIG. 1 shows several partially grown tomato plants P, their growing out of the plant protectors having progressed from their initial fragile seedling condition. As seedlings they are essentially totally enclosed and protected within the protectors. Although, not yet needed for support of the small plants P shown on FIG. 1, the stakes S are inserted into the ground at positions spaced intermediate the locations of the tomato plants P. It will be recognized that these stakes may be placed between every two or more plants rather than between every plant as is shown on the drawing. Conventionally, the stakes S are inserted in place after the transplanting of the seedlings and, indeed, they are not needed until substantial growth of the plants P has occurred.

FIG. 2 depicts a more advanced stage in the growth cycle of the plants P than that shown on FIG. 1. In FIG. 2 the plants are shown grown to a height such that the support to be provided by the stakes S is utilized by means of twine T strung between the parallel stakes so as to embrace opposite sides of and support the enlarged tomato plants P. As they continue to grow from their initial transplanted condition as plant seedlings, higher runs of support twine T on stakes S may be run to support taller tomato plants P as needed. The twine T is simply shown associated with the stakes S and plants P in the manner of conventional practice utilized in supporting tomato plants during their growth and maturing to bear fruit.

Still referring to FIGS. 1 and 2, it will be understood that these two figures illustrate only a portion of two parallel rows R. These rows and other parallel rows will extend across the entire area of a field to be planted, all in accordance with conventional practice. It will also be understood that the field will be cultivated in accordance with conventional agriculture practices. However, the conventional procedure may involve no more than spraying the alleys between the rows with a herbicide for weed control.

Particularly, the soil making up each row R will be prepared to receive the plant seedlings preparatory to carrying out the transplanting method of the invention. Although certainly it can only be generally shown, on FIGS. 3, 4 and 5 on the drawing, a body of soil 10 will be particularly prepared to receive the seedlings with this body of soil extending along each of the rows R. This body of soil 10 is loosened by "sub-soiling" with conventional small plow blades and may extend downwardly to a depth of from about 12" to about 20". The preparation procedures employed render the soil of a loose noncompacted consistency containing adequate but not excessive moisture for the plants P that are to be grown therein to be assimilated and their growth promoted starting with the root formation that is embedded in the earth E clinging to the seedling roots. As a result of the sub-soiling procedure, moisture rises through the loose soil to reach the plant roots.

At this point it may be noted that the multitude of plant seedlings which are to be transplanted, may be effectively handled by utilizing seedling flats of the type in which seeds are planted for initial growth into seedlings which are subsequently transplanted into the field rows. At least such technique is well-suited to large scale farming operations for crops such as tomatoes and the like. While this invention is certainly not limited to the use of seedling flats, and may be adapted to handling seedlings which are free of earth clinging to their root formations, a plastic seedling flat construction found appropriate for utilization in connection with the transplanting method of this invention is disclosed in Todd U.S. Pat. No. 3,667,159.

Starting with the body of prepared soil 10 along each row R, a mulch layer of sheet material 12 is spread over the area in which the plants P are to be grown. This sheet material may ideally be provided by polyethylene plastic sheeting spread longitudinally over each row R in the form of a strip of such plastic sheeting.

Preferably after the soil area is prepared and either before or concurrently with the placement of the mulch layer of sheet material 12 longitudinally over each row, the soil is fumigated by conventional procedures. For example, pesticide gas may be introduced under the mulch layer to fumigate the soil that will surround the seedling roots.

Figure 3:
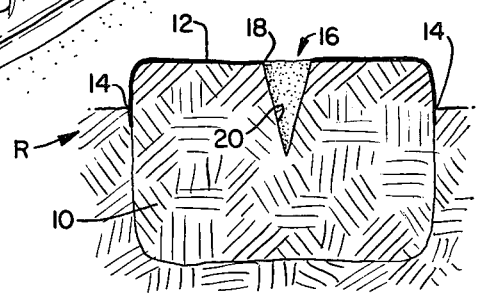
FIG. 3 is a cross-sectional view of a field row diagrammatically illustrating the prepared soil area, a mulch layer of sheet material spread over such soil area and a hole formed through the sheet material and into the soil beneath such material.
Figure 4:
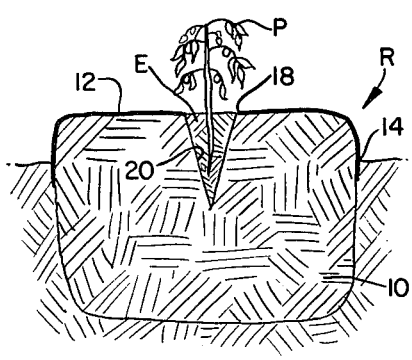
FIG. 4 is a view similar to FIG. 3 but showing a plant seedling, having earth enclosing the root formation, introduced into the hole shown in FIG. 3.
Figure 5:
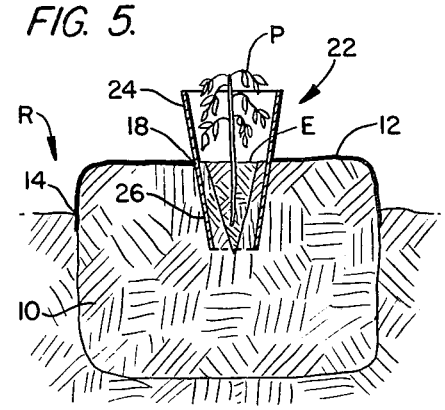
FIG. 5 is a cross-sectional view similar to FIG. 4 but showing a plant protector inserted into the soil surrounding the seedling root formation.

As shown in the sectional views of FIGS. 3, 4 and 5, the body of soil 10 preferably has a raised bed portion elevated above the land surface disposed along each edge of a row R. With this raised configuration, the longitudinal edges 14 of each strip of sheet material 12 as spread over the row are appropriately buried in the soil at the edges of the bed. By burying the edges 14 in the soil the threat of the sheet material 12 being lifted off of the row upon exposure to gusting winds or other environmental conditions is substantially diminished or alleviated. Also by effectively covering the top and sides of the row formed by the body of soil 10 the access of the soil to rain or other water sources may be more effectively controlled. Thus optimum growth promotion for the particular plants being dealt with in crop production can better be achieved.

The cross-sectional view of row R shown on FIG. 3 has the prepared body of soil 10 with a mulch layer of sheet material 12 spread over the top and sides of the row with the edges 14 of the sheet material 12 buried in the soil at the sides of the row. A hole 16 is formed through the sheet material 12 and into the soil 10 beneath the material. Although a single hole 16 is shown in FIG. 3 it will be obvious that in planting field rows R a plurality of holes 16 disposed at spaced locations will be formed longitudinally along each row to accommodate the plants to be grown in the relationship as shown on FIGS. 1 and 2.

The forming of hole 16 contemplates punching, as by utilizing a circular cutter (not shown), an aperture 18 in the sheet material 12. It is to be understood that this punching to form aperture 18 may be carried out by other techniques, such as, by burning the aperture in the polyethylene plastic sheeting making up material 12. Thereafter, the hole 16 is completed by dibbling a pocket 20 into the soil 10 that lies beneath the aperture 18 in sheet material 12. The forming of pocket 20 may be performed separately from the punching of aperture 18 or the forming of hole 16 achieved by essentially simultaneously punching the aperture 18 and dibbling the pocket 20. It is to be understood that the punching and dibbling whether done sequentially or simultaneously can be carried out by utilizing appropriate machinery or by forming the holes manually. Certainly, a manually held dibble can easily be utilized to form the pocket 20 beneath the aperture 18 in the sheet material 12 or the pocket 20 simply formed by the human hand. Solely for convenience in illustration, on the drawing the pocket 20 has been shown V-shaped but it is to be understood that the pocket may be U-shaped or of any other shape according to the manner in which it is formed.

FIG. 4 shows in cross-section, the result of carrying out the next step in the method of seedling transplanting. With the hole 16 formed as described above with reference to FIG. 3, the plant seedling P is introduced into or planted in the hole to assume the position as shown in FIG. 4. In the particular embodiment illustrated for purposes of describing the invention, the seedling P has its root formation embedded in earth E. As described above, this type seedling may come from a seedling flat. The seedling plants P may be grown from seeds in seedling flats where the earth E is provided by any conventional potting medium. Again reference may be made to the Todd U.S. Pat. No. 3,667,159 for a fuller understanding of appropriate procedures that may be employed in developing a plant seedling P having a root formation embedded in a potting medium.

The next step in carrying out the method of transplanting plant seedlings beyond that shown in FIG. 4 is illustrated on FIG. 5. As shown in this figure, a plant protector 22 is inserted through the aperture 18 in sheet material 12. This protector is generally tubular in form and preferably has a downwardly tapering form longitudinally throughout its length. The protector may be constructed of a variety of substances and the use of a translucent material permitting light access to the fragile plant seedling P can be beneficial.

The protector 22 is inserted down into the soil 10 while leaving an upper portion 24 extending a substantial distance above the sheet material 12 sufficient to enclose the stem and all or at least a major extent of the foliage portion of the seedling P. For reasons to be explained hereinafter, such extension of the protectors above the mulch surface is an essential aspect of the invention. Insertion of protector 22 also embeds a lower portion 26 in the soil 10 beneath the sheet material 12 to surround the root formation and earth E of the seedling P.

Advantageously the act of inserting the generally tubular plant protector 22 into soil 10 serves to agitate or work the soil where it surrounds the earth or potting medium E of the plant seedling P so that within the protector, improved interaction is obtained between the soil 10 making up the field row R and potting medium or earth E of the seedling plant P. The insertion also tends to compress the sides of the pocket against the potting medium E. This working and compression of the soil and potting medium or earth clinging to the root formation of seedling P where it is surrounded by the lower portion 26 of the protector 22 tends to accelerate or promote acclimation of the seedling P into the new growing environment provided by the prepared soil 10.

An important aspect of the act of inserting each generally tubular plant protector 22 through the aperture 18 in sheet material 12 lies in achieving the peripheral exterior of each protector being closely surrounded by the sheet material at the perimeter of the aperture 18. Ideally, but not necessarily, this close surrounding relationship of the sheet material will involve physical engagement between the material and the peripheral exterior of the protector. The importance of achieving this relationship lies in the fact that it excludes or substantially restricts the passage of moisture between the protector periphery and the sheet material edge of the aperture 18. The benefits flowing from excluding passage of moisture come both from preventing excessive rain water or other water source from seeping down around the exterior of the protector and into the soil 10 to the point where this soil becomes unduly compacted or water saturated as to retard root growth and general plant development. Such soil conditions can effectively drown the plant P by reason of excessive moisture. Also the warmth to which the soil 10 is subjected by sunlight beating on the exposed surface of sheet material 12 tends to promote evaporation of moisture from the soil. Thus, seepage of evaporated moisture from the body of soil 10 past the juncture between aperture 18 and the exterior of protector 22 can be undesirable.

On the other hand, the form of the generally tubular plant protector 22, particularly where it has a downwardly tapering form throughout length, is beneficial in collecting rainwater or other moisture within the protector and directing it down to the root formation within the lower portion 26 of the protector 22. Since the mulch layer prevents rainfall from compacting the soil outside of the protectors, drainage from the protectors through the loose soil is facilitated.

It may be mentioned that, depending on the plant seedlings being transplanted, water may be added as is appropriate for the particular crop or conditions encountered at the time of planting following the introduction of the seedlings and insertion of the plant protectors in the manner described. Less water is needed due to the fact that the plant protectors 22 effectively hold the water and direct it down around the seedling stem to the earth and soil enclosed within the lower portion 26 of each protector 22.

In addition to the above description of the invention, several other aspects of the invention may be commented on.

First it should be recognized that in depicting the different stages of growth of plants P on FIGS. 1 and 2 of the drawing, in both figures the plants have grown beyond the initial fragile seedling state in which they existed at the time of transplanting. As seedlings being transplanted each seedling is quite small and easily subject to destruction by mishandling or its encountering unfavorable conditions immediately or shortly after its being transplanted. Thus even the illustration of the seedling P shown in the sectional view of FIG. 5 reflects a larger and more sturdy seedling P than may be consistently available for transplanting into field rows.

The generally tubular plant protectors 22, one associated with each seedling P, offer greatly needed protection at the critical time when the fragile seedlings are planted in the field. The upper portion 24 of plant protector 22 is importantly of sufficient height to essentially surround the stem and foliage present on the seedling at the time it is placed in the prepared soil 10. This upper portion 24 ideally provides the necessary protection against wind, frost, hail, driving rain or other conditions of the environment that could easily be destructive of the fragile plant seedling particularly immediately following its being placed in the soil. Especially in sandy soils, gusting winds may blow the sand or soil particles against the fragile seedlings to the point that the plant stems are cut off. The leaf feeding area may be reduced by reason of blowing sand damage. Utilizing plant protectors 22 provides crop conditions such that the seedlings can be transplanted into the field a week to ten days earlier than would normally be possible. Younger and smaller seedlings can be transplanted with consequent reduced expense. Further, plant protectors 22 are ideal for killing insects and where a paper substance is employed it may be coated with a wax carrying an insecticide to promote insect extermination.

Also the protectors 22 promote straight plant growth. Growth proceeds upwardly out of the protector with a greater size and stronger stem of the plant. In stake tomato crops this stronger and straighter plant reduces the need for one of the several twine support tying operations that would normally be needed for the tomato plants.

Pruning of a growing tomato plant is also easier because plant suckers that usually occur near the ground surface become exposed at the top of the plant protector 22. Faster plant growth is encouraged due to the warmer environmental conditions existing inside the protector 22 surrounding each plant P. Basically, by utilizing the generally tubular protectors 22 related to a mulch layer of sheet material as described, it is much easier to get a perfect crop stand.

It has also been found that by utilizing the plant protectors 22 in the method of this invention, it is possible to utilize less expensive plant seedlings. Prior farming practices have required the use of a more expensive and larger plant due to the adversities anticipated and to which the seedlings are exposed at or shortly after the time of transplanting.

With the soil 10 beneath the plastic sheet material 12 remaining unsaturated and relatively loose, rainwater or other external water collected within the protector 22 may be readily disseminated into the loose soil 10. Without the protection of sheet material 12 the rainwater can compact the body of soil 10, and upon water filling the protectors 22 this water could not disseminate into the soil but would be retained within the protectors and effectively destroy the crop.

The generally tubular configuration of plant protector 22, particularly in a longitudinally tapering form as illustrated on FIG. 5, provides within the upper portion 24 a warmer enclosure for the seedling stem and foliage, and better drainage into the soil therebelow. By the same token, the lower portion 26 of protector 22 maintains cooler growth where there is excessive heat, and warmer conditions where there are excessive cooler temperture conditions. This lower portion 26 surround the root formation so as to achieve better plant growth both in forming a stronger stem and in encouraging root formation. It has been found that these conditions encourage formation and enlargement of a strong tap root for the plant seedling particularly tomato plants. Tomatoes transplanted by prior art techniques do not form any significant tap roots where large potted plants are used.

The combination of spreading the plastic sheet material 12 with the protectors 22 snuggly engaged in the apertues 18 formed in this sheet material gives, what may be called, a "chimney effect" that promotes plant growth. The chimney effect allows for the heat under the plastic sheet material 12 to keep the plant warm during cold weather with the warmth flowing up through the protector 22 around the plant stem and foliage. For example, heat generated under the mulch during the day can be utilized to enhibit freezing or frost damage during a night when the temperature drops excessively. It may be mentioned, that in spring planting agricultural operations the use of a black or dark plastic sheeting to provide the sheet material 12 and a protector 22 of light color, preferably of translucent material, offer a desirable combination. The plant protectors 22 protect against early cold weather or frost, thereby allowing earlier planting of a spring crop. The protectors also protect against exposure to excess heat and give shade protection in conjunction with a fall crop.

In tomato planting the normal transplanting shock is reduced. The quality of early stem development significantly affects the number of flower clusters which in turn determines the tomato fruit that is produced. By this invention the stems may be younger when transplanted and are protected during the development which occurs immediately after transplanting. The plant growth and yield are thus significantly improved.

Utilizing protectors 22 alone without the sheet material 12 is wholly impractical and disadvantageous. As described, the plants in the protectors are subjected to excessive moisture as a result of the inhibited drainage due to soil compaction around the protectors. Further a protector alone can create an environment for multiplication of bacteria, fungi, etc. The covering effect offered by the strip of plastic sheeting enables effective fumigation of the soil beneath the sheet material. The combination of the mulch and the protectors 22 also act as a weed control in that they retard or prevent germination of weed seeds even if the seed escapes fumigation.

It is intended by the claims which follow to cover the invention and the various modifications, alternatives and changes described above along with many others which will suggest themselves to those skilled in the art, but which are properly within the spirit and purpose of the present invention, as broadly as the state of the art properly permits. Of course, the invention may be carried out in other specific ways than those herein set forth without departing from the spirit and essential characteristics of the invention. The present embodiment, therefore, is to be considered in all respects as illustrative and not restrictive. All changes coming within the meaning and equivalency range of the appended claims are intended to be embraced therein.

I claim:

1. The method of transplanting tender plant seedlings for subsequent growth in an open field subject to harsh seasonable environmental conditions wherein the field soil has been prepared to receive the seedlings comprising the steps of:
   spreading a mulch layer of sheet material over the growing area of the field soil in which the plants are to be grown while exposed to open field environmental conditions;
   forming a hole through said sheet material in said area and into the soil beneath said material at each of a plurality of spaced locations;
   introducing a seedling and generally tubular open ended plant protector through said sheet material and into the soil at each of said holes for the protector to surround the seedling root formation at each of said locations thereby causing the surrounding soil to intimately contact the seedling root formation; and
   leaving an upper portion of each protector extending a substantial distance above said sheet material to protectively encircle the tender stem portion and at least a major part of the foliage of the seedling therewithin, causing said sheet material to closely surround the periphery of each said protector at the surface perimeter of each hole thereby enhancing the moisture content of said growing area.

2. The method as recited in claim 1 wherein forming each hole includes punching an aperture in said sheet material and dibbling a pocket in the soil beneath said aperture.

3. The method as recited in claim 1 wherein the soil to receive the seedlings is prepared in rows; a strip of said sheet material is spread longitudinally over each row; said holes are formed longitudinally spaced along each row; and the longitudinal edges of each strip are buried in the soil at the sides of the row which is covers.

4. The method as recited in any one of claims 1, 2 or 3 wherein said protector has a downwardly tapering form where it encloses the seedling.

5. The method of transplanting tender plant seedlings for subsequent growth in an open field subject to harsh seasonal environmental conditions wherein the field soil has been prepared to receive the seedlings comprising the steps of:
   spreading a mulch layer of sheet material over the field soil growing area in which the plants are to be grown while exposed to open field environmental conditions;
   forming a hole through said sheet material in said area and into the soil beneath said material at each of a plurality of spaced locations;
   transplanting a seedling in each of said holes;
   inserting a generally tubular open ended plant protector through said sheet material and into the soil surrounding the seedling root formation at each of said locations thereby causing the surrounding soil to intimately contact the seedling root formation; and
   leaving an upper portion of each said protector extending a substantial distance above said material to protectively encircle the tender stem portion and at least a major part of the foilage of the seedling therewithin, causing said sheet material to closely surround the periphery of each said protector at the surface perimeter of each hole thereby enhancing the moisture content of said growing area.

6. The method as recited in claim 5 wherein forming each said hole includes punching an aperture in said sheet material and dibbling a pocket in the soil beneath said aperture.

7. The method as recited in either of claims 5 or 6 wherein said sheet material is provided by an impervious plastic sheet.

8. The method as recited in either of claims 5 or 6 wherein said protector has a downwardly tapering form where it encloses the seedling.

9. The method as recited in either of claims 5 or 6 wherein the soil to receive the seedlings is prepared in rows; a strip of said sheet material is spread longitudinally over each row; said holes are formed longitudinally spaced along each row; and the longitudinal edges of each strip are buried in the soil at the sides of the row which it covers.

10. The method as recited in claim 8 wherein said protector has a longitudinal taper throughout its length and is constructed of a translucent material.

11. The method as recited in claim 8 wherein said protector is constructed of a substance that is subject to decomposition under exposure to conditions occurring in the area in which the plants are to be grown.

12. The method as recited in claim 5 wherein said substance is one that is biodegradable.

13. The method as recited in claim 5 wherein the soil area is loosened to a depth of from about 12″ to about 20″ by sub-soiling.

14. The method as recited in either of claims 5 or 13 comprising the step of fumigating said soil area before transplanting by injecting pesticide gas under said sheet material.

* * * * *